US012620055B2

(12) United States Patent
Nossek et al.

(10) Patent No.: US 12,620,055 B2
(45) Date of Patent: May 5, 2026

(54) DEEP MODULAR SYSTEMS FOR IMAGE RESTORATION

(71) Applicant: SAMSUNG ELECTRONICS CO., LTD., Suwon-si (KR)

(72) Inventors: Raz Zvi Nossek, Tel-Aviv (IL); Yuval Becker, Tel-Aviv (IL); Tomer Peleg, Tel-Aviv (IL); Stas Dubinchik, Tel-Aviv (IL)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 289 days.

(21) Appl. No.: 18/491,872

(22) Filed: Oct. 23, 2023

(65) Prior Publication Data

US 2024/0281921 A1 Aug. 22, 2024

Related U.S. Application Data

(60) Provisional application No. 63/447,467, filed on Feb. 22, 2023.

(51) Int. Cl.
*G06T 3/4015* (2024.01)
*G06T 5/50* (2006.01)

(52) U.S. Cl.
CPC .............. *G06T 3/4015* (2013.01); *G06T 5/50* (2013.01); *G06T 2207/10024* (2013.01);
(Continued)

(58) Field of Classification Search
CPC .................... G06T 3/4015; G06T 5/50; G06T 2207/10024; G06T 2207/20081;
(Continued)

(56) References Cited

U.S. PATENT DOCUMENTS

| | | | |
|---|---|---|---|
| 9,344,690 B2 | 5/2016 | Nowozin et al. | |
| 10,719,761 B2 | 7/2020 | Shazeer et al. | |

(Continued)

FOREIGN PATENT DOCUMENTS

WO 2021197583 7/2021

OTHER PUBLICATIONS

Tan et al., "Color Image Demosaicking via Deep Residual Learning," 2017. (Year: 2017).*
(Continued)

*Primary Examiner* — Phuoc Tran

(74) *Attorney, Agent, or Firm* — Morgan, Lewis & Bockius LLP

(57) ABSTRACT

Image processing systems and image processing techniques leveraging neural networks (e.g., convolutional neural networks (CNNs)) for image restoration tasks (e.g., for demosaicing tasks) are described. In certain aspects, Mixture of Experts (MoE) techniques may be employed, where multiple different expert networks are used to divide a problem space (e.g., image reconstruction tasks) into homogenous regions. For example, each MoE module may reconstruct a certain problem in an image, and a gating component may activate certain MoE modules to provide a reconstructed image. In some aspects, training and optimization techniques are described for each expert of the MoE architecture, to increase individual performance (e.g., a sub-task for each expert of an image processing system may be imposed in a residual manner, a gating function may be trained, etc.). Accordingly, image processing systems may leverage MoE architectures to support a large number of neural network parameters for improved image reconstruction applications.

16 Claims, 10 Drawing Sheets

(52) U.S. Cl.
CPC ............... *G06T 2207/20081* (2013.01); *G06T 2207/20084* (2013.01); *G06T 2207/20221* (2013.01)

(58) Field of Classification Search
CPC . G06T 2207/20084; G06T 2207/20221; G06T 5/60; G06T 5/80; G06N 3/045; G06N 3/08
See application file for complete search history.

(56) References Cited

U.S. PATENT DOCUMENTS

| | | | | |
|---|---|---|---|---|
| 10,997,690 | B2 | 5/2021 | Schwartz et al. | |
| 11,410,273 | B2 | 8/2022 | Pan et al. | |
| 11,532,073 | B2 | 12/2022 | Vogels et al. | |
| 2009/0252411 | A1* | 10/2009 | Siddiqui | G06T 3/4015 |
| | | | | 382/167 |
| 2015/0215590 | A1* | 7/2015 | Nowozin | H04N 23/83 |
| | | | | 348/242 |
| 2021/0192685 | A1* | 6/2021 | Nomura | H04N 23/843 |
| 2022/0164926 | A1 | 5/2022 | Kurmanov et al. | |
| 2022/0408012 | A1 | 12/2022 | Hwang et al. | |
| 2022/0414826 | A1* | 12/2022 | Takada | G06T 5/50 |
| 2022/0414827 | A1 | 12/2022 | Takada | |

OTHER PUBLICATIONS

Becker et al., "Make the Most Out of Your Net: Alternating Between Canonical and Hard Datasets for Improved Image Demosaicing," Mar. 28, 2023. (Year: 2023).*
Cui et al., "Color Image Demosaicking Using a 3-Stage Convolutional Neural Network Structure, " 2018. (Year: 2018).*
Gharbi, et al., "Deep Joint Demosaicking and Denoising", in SA '16 Technical Papers,, Dec. 5-8, 2016, Macao, ISBN: 978-1-4503-4514-Sep. 16, 2012, DOI: http://dx.doi.org/10.1145/2980179.2982399, 12 pages.
Qian, et al., "Rethinking the Pipeline of Demosaicing, Denoising and Super-Resolution", arXiv preprint arXiv:1905.02538v2 [eess. IV] Mar. 29, 2021, 16 pages.
Liu, et al., "Joint Demosaicing and Denoising With Self Guidance", in IEEE/CVF Conference on Computer Vision and Pattern Recognition (CVPR), Jun. 2020, DOI:10.1109/CVPR42600.2020.00231, 11 pages.
Pavlitskaya, et al., "Using Mixture of Expert Models to Gain Insights Into Semantic Segmentation", in Conference on Computer Vision and Pattern Recognition (CVPR) Workshops at: Seattle, Jun. 2020, DOI:10.1109/CVPRW50498.2020.00179, 9 pages.

* cited by examiner

115

120

125

110

105

100

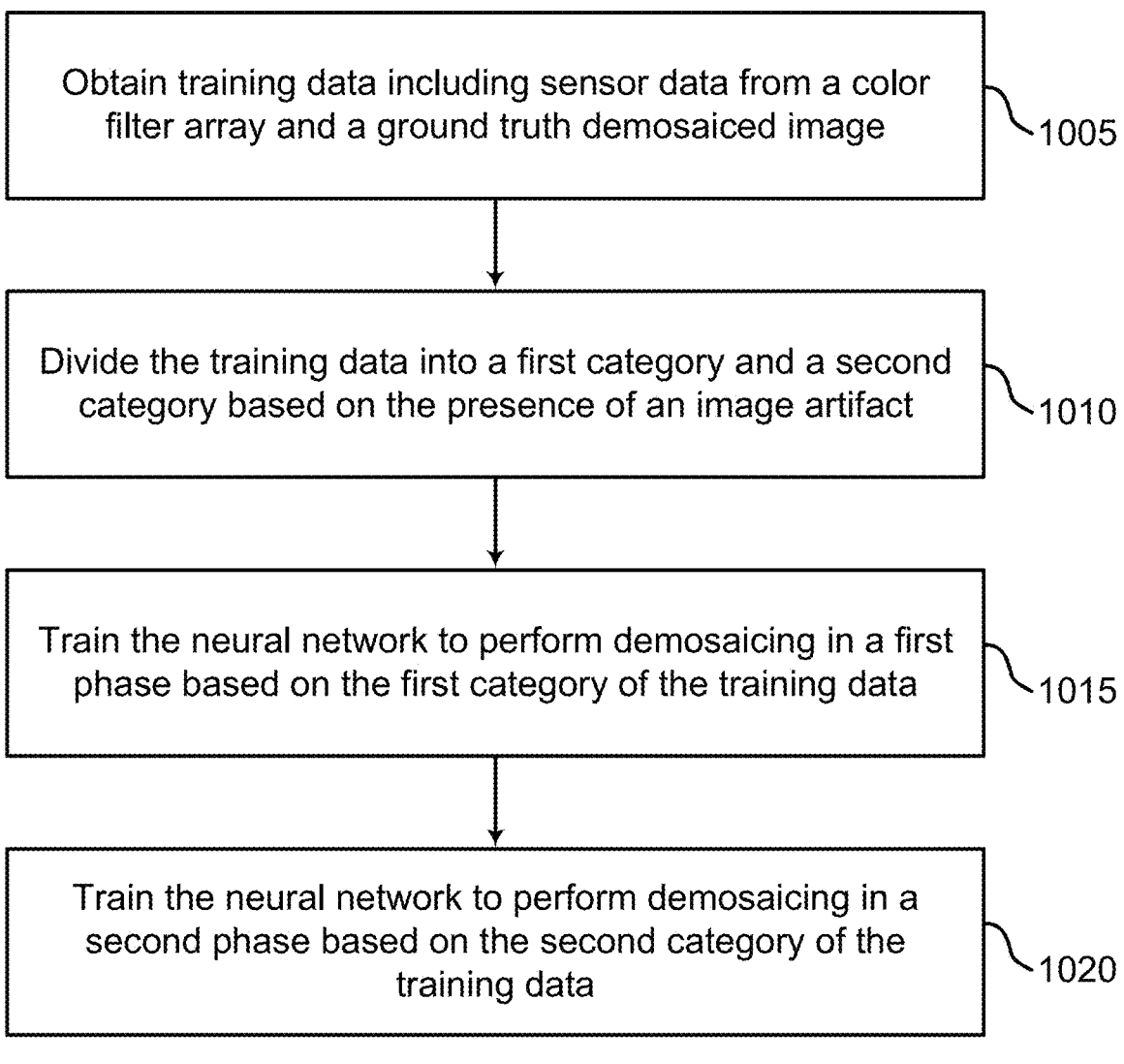

Obtain training data including sensor data from a color filter array and a ground truth demosaiced image 1005

Divide the training data into a first category and a second category based on the presence of an image artifact 1010

Train the neural network to perform demosaicing in a first phase based on the first category of the training data 1015

Train the neural network to perform demosaicing in a second phase based on the second category of the training data 1020

DEEP MODULAR SYSTEMS FOR IMAGE RESTORATION

CROSS-REFERENCE TO RELATED APPLICATION

This application claims priority to, and the benefit of, U.S. Provisional Application Ser. No. 63/447,467 filed on Feb. 22, 2023, entitled A TAIL OF CYCLIC TRAINING AND SUB-CATEGORIES FOR IMAGE DEMOSAICING. The entire contents of the foregoing application are hereby incorporated by reference for all purposes.

BACKGROUND

The following relates generally to image processing, and more specifically to modular image processing systems for image restoration.

The use of image capture devices, which may include still image cameras, moving image cameras or other electronic devices that include cameras or image sensors, has rapidly increased in recent years along with advancements in camera technology. Digital cameras may use image sensors (e.g., to capture images) and image signal processors (e.g., to process the captured images).

Image processing may generally refer to systems and techniques for editing an image (e.g., using algorithms or processing networks). For instance, image processing techniques that may be performed on captured images may include image sharpening, noise reduction, color control, image segmentation, object detection, and depth estimation, among various other specialized tasks. Such image processing techniques may be implemented for various applications such as image enhancement, image editing, robot navigation, etc.

Image sensors may include a color filter array (CFA) to separate (e.g., interpret) color information from detected light during image capture. Generally, a CFA may include, or refer to, a mosaic pattern (of filters) that covers each pixel or photodiode of a sensor array in an image sensor. For instance, a Bayer pattern mosaic is an example of a CFA that organizes/filters colors using a square grid of color filters (e.g., a repeating 2×2 square grid of color filters, where two pixels have green filters, one pixel has a red filter, and the other pixel has a blue filter). Therefore, an image sensor may produce a Red Green Blue (RGB) image after filtering has occurred. Image processing techniques may then be implemented to rebuild an image (e.g., using unfinished output color samples from the image sensor) in a process known as demosaicing. In certain aspects, demosaicing techniques may interpolate the missing color information by analyzing the neighboring pixels' values and applying color reconstruction techniques. Reconstructing full-resolution RGB color images from incomplete data (e.g., data obtained from the use of a CFA) may be complex and challenging. Moreover, conventional image reconstruction techniques may be costly in terms of time and/or energy (e.g., processing requirements). Therefore, there is a need in the art for systems and techniques enabling improved image restoration.

SUMMARY

A method, apparatus, non-transitory computer readable medium, and system for modular image processing systems for image restoration are described. One or more aspects of the method, apparatus, non-transitory computer readable medium, and system include obtaining sensor data from an image sensor comprising a color filter array; performing, by a first demosaicing expert, a first demosaicing operation to obtain a first demosaiced image based on the sensor data; performing, by a second demosaicing expert, a second demosaicing operation to obtain a second demosaiced image based on the sensor data; and generating (e.g., via a gating component) an output image by combining the first demosaiced image and the second demosaiced image.

An apparatus, system, and method for modular image processing systems for image restoration are described. One or more aspects of the apparatus, system, and method include at least one processor; at least one memory storing instructions and in electronic communication with the at least one processor; an image sensor comprising a color filter array; a first demosaicing expert comprising parameters stored in the at least one memory and configured to perform a first demosaicing operation to obtain a first demosaiced image based on the sensor data from the image sensor; a second demosaicing expert comprising parameters stored in the at least one memory and configured to perform a second demosaicing operation to obtain a second demosaiced image based on the sensor data; and a gating component configured to combine the first demosaiced image and the second demosaiced image to obtain an output image.

A method, apparatus, non-transitory computer readable medium, and system for modular image processing systems for image restoration are described. One or more aspects of the method, apparatus, non-transitory computer readable medium, and system include obtaining training data including sensor data from a color filter array and a ground truth demosaiced image (e.g., an estimated ground truth demosaiced image obtained from an image signal processor (ISP) pipeline/chain); dividing the training data into a first category and a second category based at least in part on the presence of an image artifact; training the neural network to perform demosaicing in a first phase based on the first category of the training data; and training the neural network to perform demosaicing in a second phase based on the second category of the training data.

BRIEF DESCRIPTION OF THE DRAWINGS

FIG. 10 shows an example of a method for training an image processing system, according to aspects of the present disclosure.

DETAILED DESCRIPTION

Figure 1:
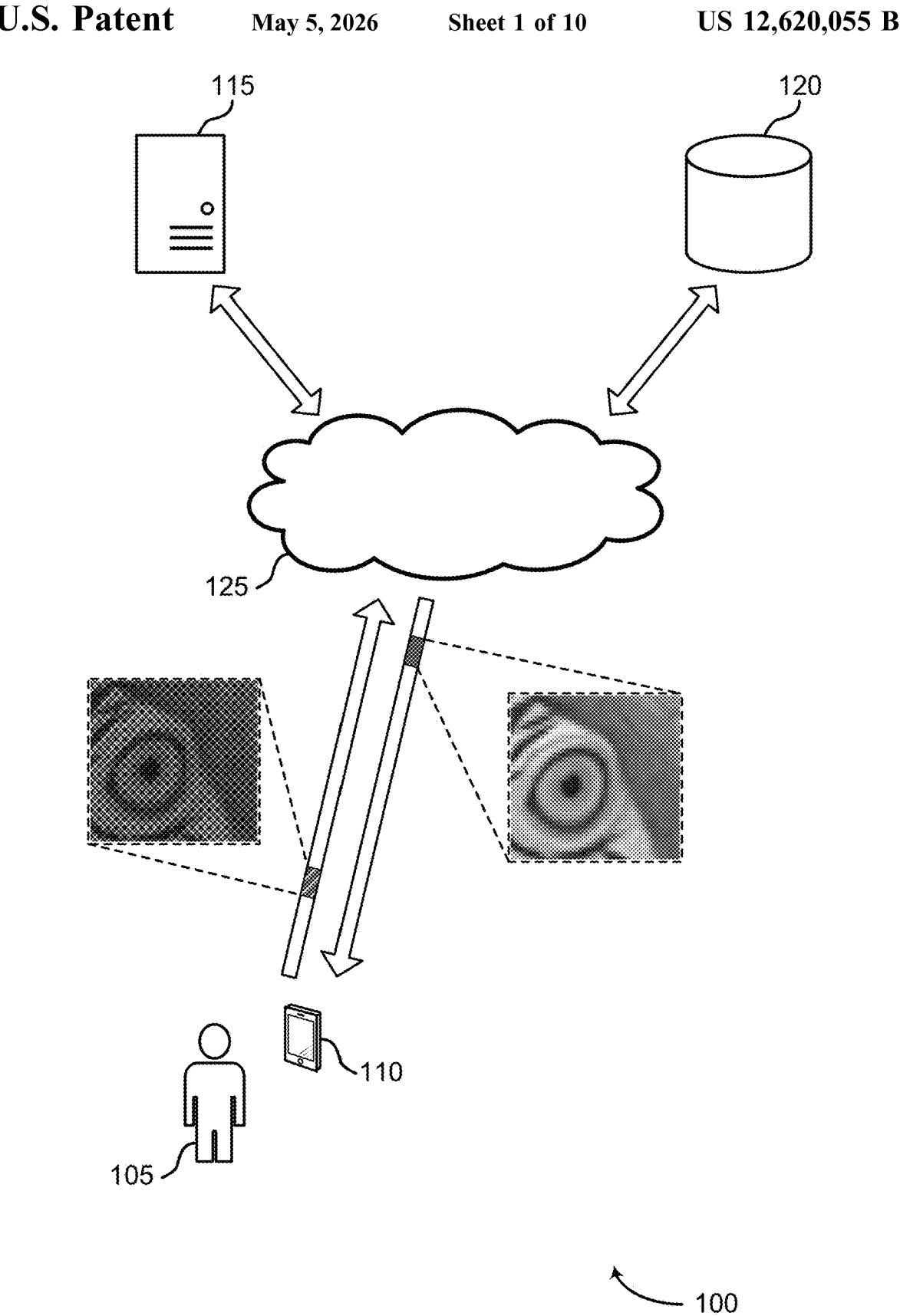
FIGS. 1 through 5 show examples of image processing systems, according to aspects of the present disclosure.

Image processing technologies are employed in various fields including photography, video processing, robotics (e.g., computer vision), and more. Image processing or digital image processing refers to the use of a computer to edit a digital image (e.g., or synthesize an image) using an algorithm or a processing network. Accordingly, image processing techniques may be implemented to enhance (e.g., correct or improve) images, to remove undesirable artifacts, to edit or modify images, etc.

Image restoration techniques, such as denoising and deblurring, may be implemented to recover high-quality images from degraded input data. For example, some input data (such as input data obtained via an image sensor including a color filter array (CFA)) may be degraded as red, green, and blue (RGB) color channels are sampled at different locations and rates, which can cause aliasing issues. In digital photography, image demosaicing refers to the process of reconstructing a full-resolution RGB color image from such incomplete/degraded data that is obtained from the use of a CFA (e.g., image demosaicing may include reconstruction of a full-resolution image from image data obtained from a Bayer pattern FCA of green, red, blue, green (GRBG)). In digital cameras, a CFA may sample only a fraction of image information, which makes the task of demosaicing complex and challenging.

As described in more detail herein, image processing systems leveraging neural networks (e.g., convolutional neural networks (CNNs)) may be implemented for image restoration tasks (e.g., for demosaicing tasks). In certain aspects, image processing systems described herein may employ Mixture of Experts (MoE) techniques, where multiple different expert networks are used to divide a problem space (e.g., image reconstruction tasks) into homogenous regions. For example, each MoE module may reconstruct a certain problem in an image, and a gating component may activate certain MoE modules to provide a reconstructed image, as described in more detail herein. Accordingly, image processing systems of the present disclosure may leverage MoE architectures to support a large number of neural network parameters (e.g., for image reconstruction applications) via reduced computational resources (e.g., as MoE techniques may increase the parameters of the image processing network, without proportionately increasing the amount of computation). In one embodiment, a CNN for image demosaicing is implemented using MoE.

In certain aspects, classical image restoration priors may be applied in the design of the network architecture and optimization scheme, which may increase the network's interpretability. In addition, training and optimization techniques are described for each expert of the MoE architecture, to increase individual performance (e.g., a sub-task for each expert of an image processing system may be imposed in a residual manner, a gating function may be trained, etc.). Accordingly, image processing systems may more efficiently (e.g., more accurately, using less computational resources, such as via reduced neural networks, etc.) perform image restoration tasks, such as improving color Moiré, color desaturation, resolution, text readability, etc. Further, due to a modular approach based on the MoE architecture, the network may be more readily adapted (e.g., based on customer feedback), as aspects of training may be performed per chosen sub-module, without the need for training the entire model.

Embodiments of the present disclosure may be used in the context of various image processing applications (e.g., such as image editing and image restoration applications). For example, an image processing system based on the present disclosure may use image information (e.g., CFA input data) to generate restored output images. Example embodiments of the present disclosure in the context of image processing systems are described with reference to FIGS. 1 through 5. Details regarding example image restoration processes (e.g., example demosaicing processes) are then described with reference to FIGS. 6 and 7. Details regarding example network training aspects (e.g., example cyclic training processes, example model-specific training aspects, etc.) are then described with reference to FIGS. 8 through 10.

Image Processing Systems

FIG. 1 shows an example of an image processing system 100 according to aspects of the present disclosure. In one aspect, image processing system 100 includes user 105, user device 110, server 115, database 120, and cloud 125. Image processing system 100 is an example of, or includes aspects of, the corresponding element described with reference to FIGS. 2-5.

In the example of FIG. 1, user device 110 may obtain (e.g., capture) an image and, through image processing system 100, perform image processing techniques described herein (e.g., demosaicing of the captured image, which may be performed solely on user device 110 or may involve some combination of server 115, database 120, and cloud 125). User device 110 may include a computing device, personal computer, laptop computer, mainframe computer, palmtop computer, personal assistant, mobile device, or any other suitable processing apparatus.

User 105 may interact with user device 110 using various interfaces of user device 110. For instance, user 105 may capture an image via user device 110 (e.g., via an image sensor of user device 110), after which image processing system 100 may initiate image processing techniques described herein (e.g., demosaicing techniques, modular image restoration techniques, etc.). For instance, in some examples, user device 110 may itself perform image processing of the obtained image. Alternatively, in some examples, user device 110 sends the obtained image data to server 115 or to cloud 125 for image processing.

In examples where server 115 receives the image data from user device 110, server 115 may perform one or more image processing tasks (e.g., such as preparing the image data for demosaicing tasks, demosaicing tasks, image refinement tasks post demosaicing tasks, etc.). In some cases, server 115 may send the image data to cloud 125 or database 120 for further processing or storage.

A server 115 may provide one or more functions to users 105 linked by way of one or more of the various networks. In some cases, server 115 includes a single microprocessor board, which includes a microprocessor responsible for controlling all aspects of server 115. In some cases, a server 115 uses microprocessor and protocols to exchange data with other devices/users 105 on one or more of the networks via hypertext transfer protocol (HTTP), and simple mail transfer protocol (SMTP), although other protocols such as file transfer protocol (FTP), and simple network management protocol (SNMP) may also be used. In some cases, server 115 is configured to send and receive hypertext markup language (HTML) formatted files (e.g., for displaying web pages). In various embodiments, server 115 comprises a general purpose computing device, a personal computer, a laptop computer, a mainframe computer, a super computer, or any other suitable processing apparatus.

Database 120 may serve as an organized collection of data within the image processing system 100. Database 120 may store the image data received from server 115 or directly from user device 110. In some cases, database 120 may store previous image data and associated demosaicing results (e.g., which may guide the image processing of new images). A database 120 is an organized collection of data. For example, database 120 stores data in a specified format known as a schema. Database 120 may be structured as a single database, a distributed database, multiple distributed databases, an emergency backup database, etc. In some cases, a database controller may manage data storage and processing in database 120. In some cases, user 105 interacts with a database controller. In other cases, a database controller may operate automatically without user 105 interaction.

Cloud 125 (e.g., which may function as a network offering on-demand computer system resources) may be involved in various stages of image processing. In some cases, cloud 125 may store the image data sent by user device 110 or server 115, cloud 125 may perform image processing tasks on the image data, etc. In some implementations, after the image processing tasks, the processed image data may be stored in cloud 125, sent back to server 115 for further processing, or directed to user device 110 for displaying of the processed image data (e.g., the output image) to user 105. A cloud 125 is a computer network configured to provide on-demand availability of computer system resources, such as data storage and computing power. In some examples, cloud 125 provides resources without active management by user 105. The term cloud 125 is sometimes used to describe data centers available to many users 105 over the Internet. Some large cloud networks have functions distributed over multiple locations from central servers 115. A server 115 may be designated an edge server 115 if it has a direct or close connection to a user 105. In some cases, cloud 125 is limited to a single organization. In other examples, cloud 125 is available to many organizations. In one example, cloud 125 includes a multi-layer communications network comprising multiple edge routers and core routers. In another example, cloud 125 is based on a local collection of switches in a single physical location.

Image processing system 100 shows one example of a system that enables obtaining images, processing obtained images, and generating output images, according to systems and techniques described herein. Other system configurations may be implemented by analogy, without departing from the scope of the present disclosure.

Figure 2:
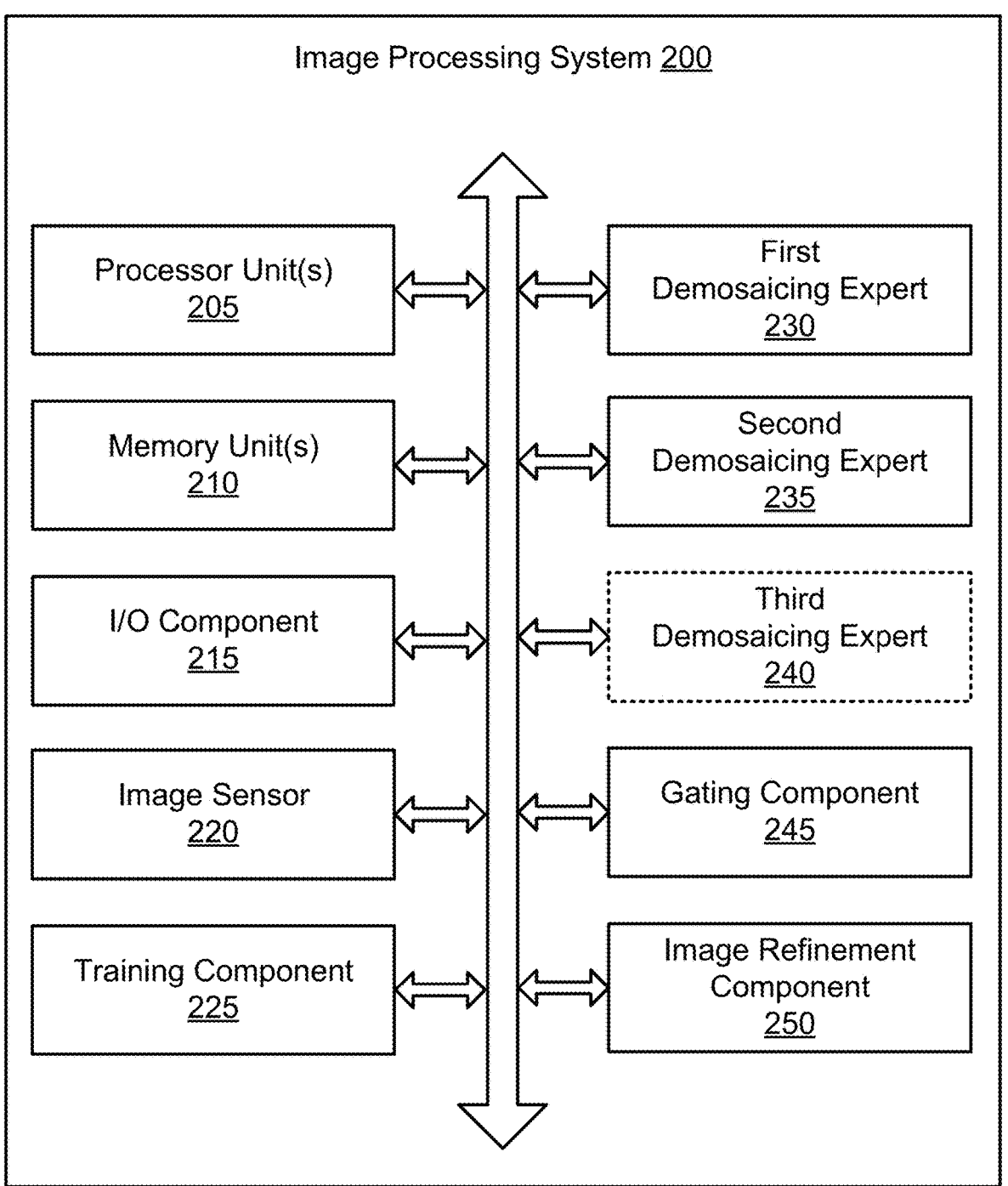

FIG. 2 shows an example of an image processing system 200 according to aspects of the present disclosure. In one aspect, image processing system 200 includes processor unit 205, memory unit 210, I/O component 215, image sensor 220, training component 225, first demosaicing expert 230, second demosaicing expert 235, third demosaicing expert 240, gating component 245, and image refinement component 250. Image processing system 200 is an example of, or includes aspects of, the corresponding element described with reference to FIGS. 1, and 3-5.

A processor unit 205 is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, the processor unit 205 is configured to operate a memory array using a memory controller. In other cases, a memory controller is integrated into the processor unit 205. In some cases, the processor unit 205 is configured to execute computer-readable instructions stored in a memory to perform various functions. In some embodiments, a processor unit 205 includes special purpose components for modem processing, baseband processing, digital signal processing, or transmission processing.

Examples of a memory unit 210 include random access memory (RAM), read-only memory (ROM), or a hard disk.

Examples of memory unit 210 is include solid state memory and a hard disk drive. In some examples, memory unit 210 is used to store computer-readable, computer-executable software including instructions that, when executed, cause a processor unit 205 to perform various functions described herein. In some cases, the memory unit 210 contains, among other things, a basic input/output system (BIOS) which controls basic hardware or software operation such as the interaction with peripheral components or devices. In some cases, a memory controller operates memory cells of memory unit 210. For example, the memory controller can include a row decoder, column decoder, or both. In some cases, memory cells within a memory unit 210 store information in the form of a logical state.

An I/O component 215 may manage input and output signals for a device. I/O component 215 may also manage peripherals not integrated into a device. In some cases, an I/O component 215 may represent a physical connection or port to an external peripheral. In some cases, an I/O component 215 may utilize an operating system such as iOS®, ANDROID®, MS-DOS®, MS-WINDOWS®, OS/2®, UNIX®, LINUX®, or another known operating system. In other cases, an I/O component 215 may represent or interact with a modem, a keyboard, a mouse, a touchscreen, or a similar device. In some cases, an I/O component 215 may be implemented as part of a processor unit 205. In some cases, a user may interact with a device via I/O component 215 or via hardware components controlled by an I/O component 215.

An artificial neural network (ANN) is a hardware or a software component that includes a number of connected nodes (i.e., artificial neurons), which loosely correspond to the neurons in a human brain. Each connection, or edge, transmits a signal from one node to another (like the physical synapses in a brain). When a node receives a signal, it processes the signal and then transmits the processed signal to other connected nodes. In some cases, the signals between nodes comprise real numbers, and the output of each node is computed by a function of the sum of its inputs. In some examples, nodes may determine their output using other mathematical algorithms (e.g., selecting the max from the inputs as the output) or any other suitable algorithm for activating the node. Each node and edge is associated with one or more node weights that determine how the signal is processed and transmitted.

During the training process, these weights are adjusted to improve the accuracy of the result (i.e., by minimizing a loss function which corresponds in some way to the difference between the current result and the target result). The weight of an edge increases or decreases the strength of the signal transmitted between nodes. In some cases, nodes have a threshold below which a signal is not transmitted at all. In some examples, the nodes are aggregated into layers. Different layers perform different transformations on their inputs. The initial layer is known as the input layer and the last layer is known as the output layer. In some cases, signals traverse certain layers multiple times.

A convolutional neural network (CNN) is a class of neural network that is commonly used in computer vision or image classification systems. In some cases, a CNN may enable processing of digital images with minimal pre-processing. A CNN may be characterized by the use of convolutional (or cross-correlational) hidden layers. These layers apply a convolution operation to the input before signaling the result to the next layer. Each convolutional node may process data for a limited field of input (i.e., the receptive field). During a forward pass of the CNN, filters at each layer may be convolved across the input volume, computing the dot product between the filter and the input. During the training process, the filters may be modified so that they activate when they detect a particular feature within the input.

According to some aspects, image sensor 220 obtains sensor data from an image sensor 220 including a color filter array. In some aspects, the color filter array includes a Bayer color filter array.

According to some aspects, training component 225 obtains training data including sensor data from a color filter array and a ground truth demosaiced image. In some examples, training component 225 divides the training data into a first category and a second category based on the presence of an image artifact. In some examples, training component 225 trains the neural network to perform demosaicing in a first phase based on the first category of the training data. In some examples, training component 225 trains the neural network to perform demosaicing in a second phase based on the second category of the training data. In some aspects, the first training phase is based on a specific dataset excluding the first category of the training data, and the second training phase is based on a general dataset that includes the first category of the training data and the second category of the training data. In some examples, training component 225 trains the neural network to perform demosaicing in a third phase based on the first category of the training data. In some examples, training component 225 trains a first demosaicing expert 230 of the neural network to perform a first demosaicing operation to obtain a first demosaiced image based on the sensor data from the image sensor 220. In some examples, training component 225 trains a second demosaicing expert 235 of the neural network to perform a second demosaicing operation to obtain a second demosaiced image based on the sensor data. In some aspects, a gating component 245 of the neural network is trained in the first phase and the second phase after training the first demosaicing expert 230 and the second demosaicing expert 235. In some aspects, training component 225 may train the network in phases (e.g., or in one sweep).

According to some aspects, first demosaicing expert 230 performs a first demosaicing operation to obtain a first demosaiced image based on the sensor data. In some aspects, the first demosaicing operation includes a general demosaicing operation, and the second demosaicing operation includes a residual demosaicing operation that corrects one or more image artifacts (e.g., reconstructs other image domains which are prone to one or more image artifacts).

According to some aspects, second demosaicing expert 235 performs a second demosaicing operation to obtain a second demosaiced image based on the sensor data. In some aspects, the second demosaicing operation further includes: performing a first partial demosaicing operation on a green color of the sensor data to obtain green image data; and performing a second partial demosaicing operation based on the green image data to obtain red image data and blue image data. In some examples, second demosaicing expert 235 computes one or more color correlation coefficients, where the second partial demosaicing operation is based on the one or more color correlation coefficients.

In some aspects, the first demosaicing expert 230 may be trained (e.g., the first demosaicing expert 230 may be trained first, on the entire dataset), and on the fail cases of the first demosaicing expert 230 the artifacts categories may be determined or built to train the second demosaicing expert 235 (e.g., and in some cases the second demosaicing expert 235 may include or be referred to as the residual network).

In some aspects, first demosaicing expert 230 and second demosaicing expert 235 may be trained in a sequence. In some aspects, operations (e.g., inference operations, demosaicing operations, etc.) performed by first demosaicing expert 230 and second demosaicing expert 235 may be performed in parallel. In some examples, training of first demosaicing expert 230 and second demosaicing expert 235 may be performed on a first apparatus or device, and may and inference of first demosaicing expert 230 and second demosaicing expert 235 may be performed on a second apparatus or device (e.g., training and inference may be performed on separate machines or devices).

According to some aspects, third demosaicing expert 240 performs a third demosaicing operation to obtain a third demosaiced image based on the sensor data, where the output image is generated based on third demosaiced image.

According to some aspects, gating component 245 generates an output image by combining the first demosaiced image and the second demosaiced image. In some examples, gating component 245 computes a weighting map including weighting parameters for each pixel of the first demosaiced image and the second demosaiced image, where the output image is generated based on the weighting map.

According to some aspects, image refinement component 250 performs an image refinement on the output image to obtain a refined image.

Image sensor 220 is an example of, or includes aspects of, the corresponding element described with reference to FIGS. 3 and 4. First demosaicing expert 230 is an example of, or includes aspects of, the corresponding element described with reference to FIGS. 4 and 9. Second demosaicing expert 235 is an example of, or includes aspects of, the corresponding element described with reference to FIGS. 4, 5, and 9. Gating component 245 and image refinement component 250 are each examples of, or include aspects of, the corresponding elements described with reference to FIG. 4.

Figure 3:
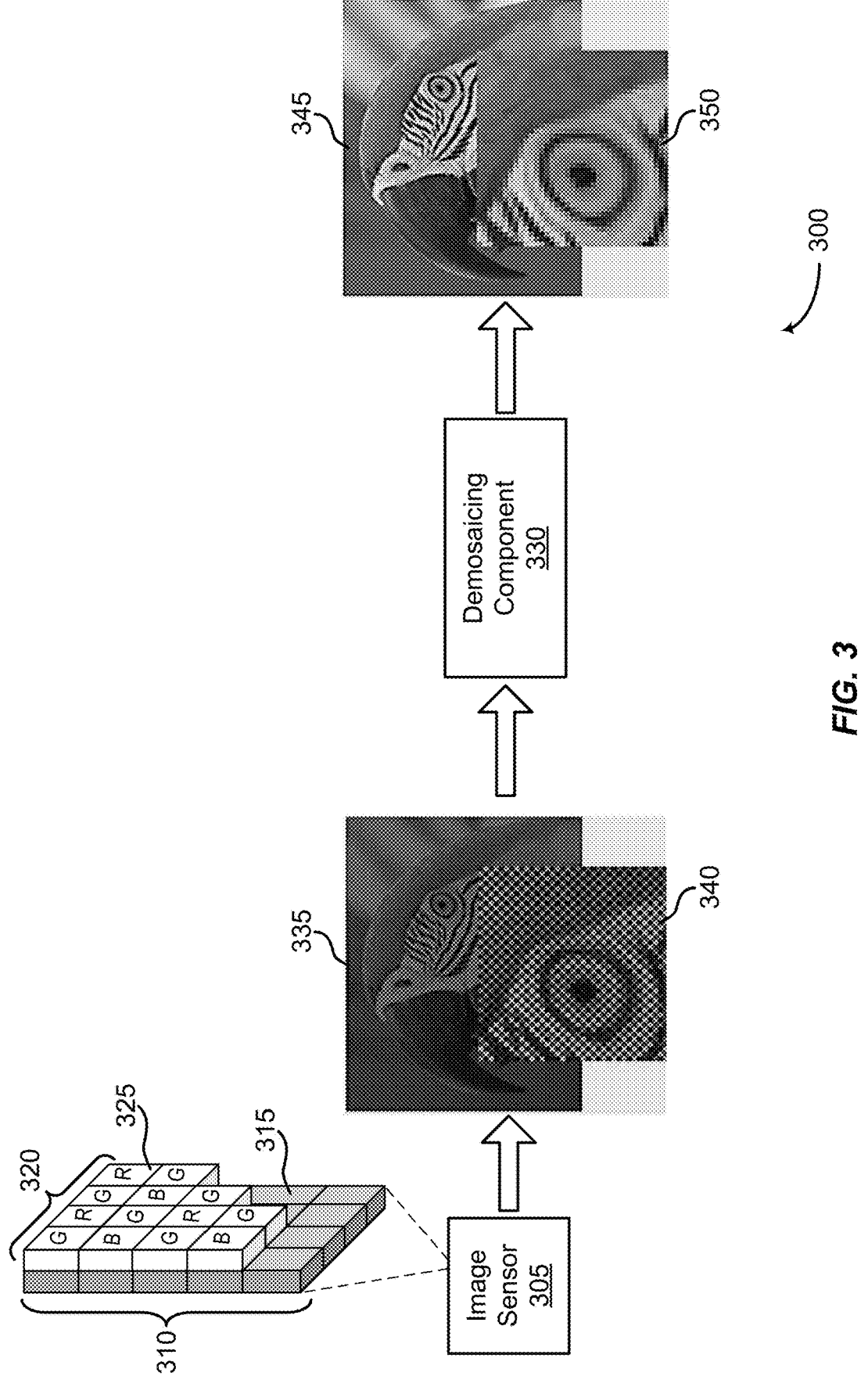

FIG. 3 shows an example of an image processing system 300 according to aspects of the present disclosure. Image processing system 300 includes an image sensor 305, which includes an image sensor array 310 (an array of pixels 315) and a color filter array 320 (an array of color filter cells 325). Image processing system 300 also includes a demosaicing component 330, an input image 335 comprising original sensor data 340, and an output image 345 comprising corrected sensor data 350.

The image sensor 305 captures visual data within the image processing system 300. Image sensor 305 converts light into electrical signals that can be processed into an image. The image sensor 305 includes an image sensor array 310 and a color filter array 320. In some aspects, image sensor 305 (e.g., a camera) may incorporate a sensor array 310 of pixels 315 (which may be referred to as a pixel array) constructed from a matrix of photodiodes. Each photodiode (e.g., each of pixels 315) in the sensor array 310 functions as a light-sensitive element, detecting photons and converting the incident light into an electrical charge corresponding to a specific pixel in the final image.

The image sensor array 310, part of image sensor 305, is composed of multiple pixels 315. These pixels 315 are photo-sensitive elements that respond to incident light and convert the incident light into electrical signals. Each pixel 315 in the array captures a portion of sensor data 340 (e.g., a small portion of the scene being imaged), contributing to the formation of the input image 335.

The color filter array 320, also included in image sensor 305, includes an arrangement of color filter cells 325. Each color filter cell 325 allows only certain wavelengths of light to pass through, corresponding to a specific color (e.g., red, green, or blue). Color filter cells 325 are placed over the pixels 315, enabling the capture of color information (e.g., sensor data 340) in the input image 335. In some embodiments, color filter array 320, which is a mosaic of tiny color filters (e.g., cells 325), is overlaid on top of the sensor array 310 of pixels 315 to capture color information. Each of the color filter cells 325 in the color filter array 320 allows only a certain color (e.g., red, green, or blue) of the incoming light to pass through and reach the underlying pixels 315. When light passes through the color filter array 320 and strikes the pixels 315, each pixel generates an electrical signal proportional to the intensity of the filtered light. The signal is then converted to digital form and processed to produce the final colored image.

The arrangement and pattern of color filter cells 325 in the color filter array 320 may vary. One example configuration is a Bayer filter pattern, where each 2×2 cell grid contains two green filter cells 325, one red filter cell 325, and one blue filter cell 325 (e.g., and the configuration may include any of the four GRBG permutations). The use of two green filter cells 325 takes advantage of human vision's higher sensitivity to green light. Once these signals are captured, image processing system 300 (e.g., a camera) may use demosaicing algorithms described herein to interpolate the color information from the surrounding pixels 315, producing a full-color image. In some aspects, image processing system 300 has the ability to capture high-resolution, full-color images based on the collaborative functioning of the sensor array 310 of pixels 315 and the color filter array 320 of color filter cells 325.

Demosaicing component 330 may be designed to convert the mosaic of color samples captured by the image sensor 305 into a full-color image. This conversion is accomplished by interpolating the color values for each pixel 315, using the values of neighboring pixels and the color filter cells 325 information. The demosaicing component 330 transforms the input image 335 into the output image 345 (e.g., demosaicing component 330 may transform, or correct, sensor data 340 into corrected image data 350). The demosaicing component 330 may include, or represent, one or more processing units and/or software within the image processing system 300. In some aspects, demosaicing component 330 may include a first demosaicing expert, a second demosaicing expert, and gating component (e.g., as described in more detail herein, for example, with reference to FIGS. 2, 4, 5, and 9).

The input image 335, which includes original sensor data 340, represents the raw information captured by the image sensor 305. The original sensor data 340 contains the pixel intensity values and associated color information (e.g., from the sensor array 310 and color filter array 320). This sensor data 340 may serve as the input for the demosaicing component 330.

In the example of FIG. 3, the output image 345 is the output of the image processing system 300. Output image 345 includes corrected sensor data 350, which is the result of the demosaicing process(es) applied to the input image 335 by the demosaicing component 330. In some aspects, the output image 345, including the corrected sensor data 350, is a full-color image, representing the successful operation of the image processing system 300. For instance, the example of FIG. 3 illustrates an input image 335 of a parrot being processed (e.g., via demosaicing image processing techniques) to provide an output image 345 which is a full-resolution corrected representation of the parrot.

Image demosaicing (e.g., using the demosaicing component 330) is a component in image processing and is part of a class of tasks referred to as image restoration. In some aspects, neural networks may be utilized to mitigate types of low-level vision tasks. Additionally, MoE methods may be leveraged for image processing, as MoE techniques can enable an image processing system (e.g., the image processing system 300) to increase the parameters of a neural network without increasing the amount of computation by the same proportion. However, MoE techniques may not be conventionally used for image restoration tasks and/or for image demosaicing tasks. Further, demosaicing operations may be implemented in devices (e.g., digital cameras) with limited computational resources. As such, embodiments of the present disclosure may implement neural networks for demosaicing operations in an effective and efficient manner (e.g., using MoE techniques and reduced computational resources).

In some embodiments, a neural network (e.g., a CNN) is provided herein for image demosaicing implemented using MoE (e.g., MoE architectures, MoE techniques, etc., as described in more detail herein). For example, a sub-task for each expert (e.g., of the demosaicing component 330 using MoE) may be imposed in a residual manner, and a gating function (e.g., of the demosaicing component 330) may be trained based on parameters or information from each expert. Accordingly, the network architecture and optimization scheme described herein may enhance performance of the image processing system 300 (e.g., for image restoration), which in turn may also increase network interpretability. In some aspects, training and optimization techniques may be performed for each expert to increase individual performance of each expert.

As described herein, a neural network architecture may be implemented for a demosaic task and may attempt to produce full resolution RGB images from a sensor CFA. In some aspects, the CFA of the sensor may be processed (e.g., by the neural network) based on a Bayer pattern. Additionally, in certain aspects, the Bayer image (e.g., image captured using pixels configured with the Bayer pattern) received from the sensor may be processed based on a linear space (e.g., the Bayer image may not undergo a gamma correction or have its dynamic range compressed). Some aspects of the techniques described herein may be described with reference to a Bayer CFA for the purpose of providing examples, however the present disclosure is not limited to such implementations (e.g., other CFAs, such as may be implemented and the systems and techniques may be applied by analogy, without departing from the scope of the present disclosure). For instance, if the CFA sensor does not use a Bayer pattern and/or the Bayer image is not in linear space, the neural network architecture described herein may be applied for image processing (e.g., and the neural network architecture may need to be trained again based on the physical characteristics of the implemented CFA, based on gamma correction or dynamic range aspects, etc.). That is, the data for training and the data for inference may be collected from a same domain or distribution. In some embodiments, the techniques described herein may combine image signal processing data prior to the network architecture, perform custom optimization for each of the experts using a mechanism for the training of each expert, and introduce a non-standard method for training a gating function.

In some aspects, image processing system 300 is an example of, or includes aspects of, the corresponding element described with reference to FIGS. 1, 2, 4, and 5. Image sensor 305 is an example of, or includes aspects of, the corresponding element described with reference to FIGS. 2 and 4. Sensor data 340 is an example of, or includes aspects of, the corresponding element described with reference to FIGS. 4 and 5. Output image 345 is an example of, or includes aspects of, the corresponding element described with reference to FIG. 4. Corrected image data 350 is an example of, or includes aspects of, the corresponding element described with reference to FIG. 5.

Figure 4:
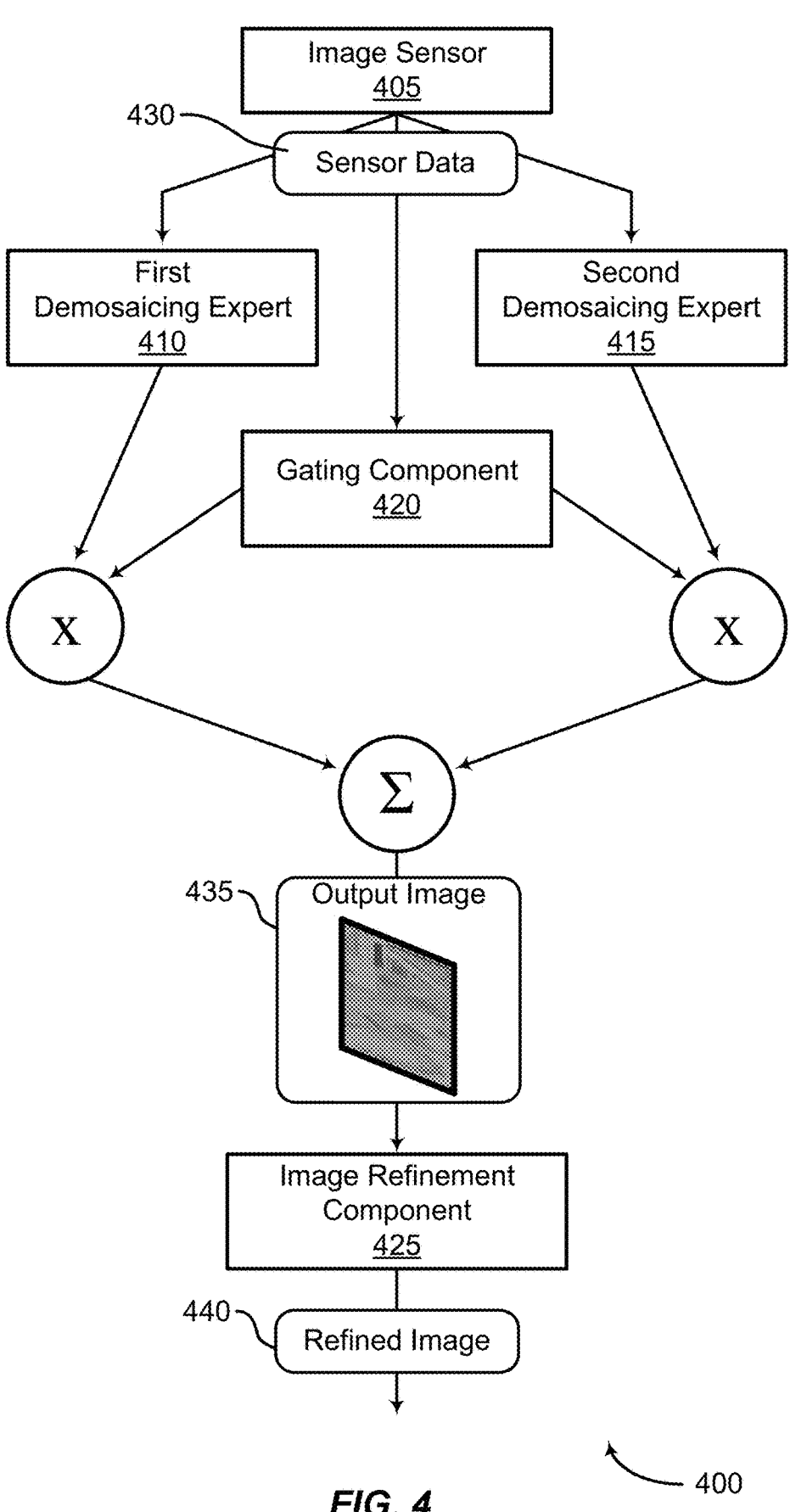

FIG. 4 shows an example of an image processing system 400 according to aspects of the present disclosure. In one aspect, image processing system 400 includes image sensor 405, first demosaicing expert 410, second demosaicing expert 415, gating component 420, image refinement component 425, sensor data 430, output image 435, and refined image 440. Image processing system 400 is an example of, or includes aspects of, the corresponding element described with reference to FIGS. 1-3, and 5. Image sensor 405 is an example of, or includes aspects of, the corresponding element described with reference to FIGS. 2 and 3. First demosaicing expert 410 is an example of, or includes aspects of, the corresponding element described with reference to FIGS. 2 and 9. Second demosaicing expert 415 is an example of, or includes aspects of, the corresponding element described with reference to FIGS. 2, 5, and 9. Gating component 420 is an example of, or includes aspects of, the corresponding element described with reference to FIG. 2. Image refinement component 425 is an example of, or includes aspects of, the corresponding element described with reference to FIG. 2. Sensor data 430 is an example of, or includes aspects of, the corresponding element described with reference to FIGS. 3 and 5. Output image 435 is an example of, or includes aspects of, the corresponding element described with reference to FIG. 3.

In some aspects, the image processing system 400 may employ or represent MoE techniques as described herein. For example, the image processing system 400 may include multiple different expert networks (e.g., the first demosaicing expert 410, the second demosaicing expert 415, etc.) that are used to divide a problem space (e.g., image reconstruction tasks) by some property (e.g., into homogenous regions). In some examples, each MoE module (e.g., each of the first demosaicing expert 410, the second demosaicing expert 415, etc.) may reconstruct a certain problem in an image, and an additional component (e.g., the gating component 420) may activate certain MoE modules to provide a reconstructed image. As an example, first demosaicing expert 410 may focus on (e.g., may be configured to reconstruct) an artifact type such as one of: color Moiré, color desaturation, resolution, text readability; while second demosaicing expert 415 may focus on a different type of artifact such as a one of: color Moiré, color desaturation, resolution, text readability different from the first demosaicing expert 410 artifact type.

In some aspects, an image artifact may include or refer to image reconstruction artifacts (e.g., an division of data to artifacts may be different fail cases of first demosaicing expert 410). In some examples, there are multiple categories of different artifacts some image patches may have different types of artifacts (e.g., different demosaicing experts may be trained to process different types of artifacts).

In some examples, the gating component 420 may implement "hard gating" techniques and may determine which reconstruction to use from the different experts (e.g., gating component 420 activates specific experts during image processing tasks to provide the correct image reconstruction, while other experts not selected by the gating component

420 may remain inactive, thus reducing computing resources). In some examples, gating component 420 may implement "soft gating" techniques (e.g., a weighting function may be used for output from the multiple experts, and the outputs may be summed according to the weighting function).

Accordingly, the image processing system 400 may leverage MoE architectures to support a large number of neural network parameters (e.g., for image reconstruction applications) via reduced computational resources (e.g., as MoE techniques may increase the parameters of the image processing network, without proportionately increasing the amount of computation). In one embodiment, a CNN for image demosaicing is implemented using MoE. For example, the image processing system 400 may represent a modular neural network composed by a MoE that is organized in functions and architecture inspired by image signal processing design principles.

As described herein, the image processing system 400 may process and/or restore images in image capture devices (e.g., still image cameras, moving image cameras, digital cameras, computer vision, etc.). More particularly, the image processing system 400 may implement a modular neural net architecture for image reconstruction. The modular neural net architecture may enable a system for a demosaicing algorithm for image restoration or image reconstruction. The demosaicing algorithm may reconstruct a full-resolution RGB color image from missing data captured using a CFA (e.g., such as the Bayer pattern of GRBG, where two-thirds of the image information may be missing). Accordingly, using the techniques described herein, the image processing system 400 may provide compensation or corrections of effects (e.g., artifacts) in captured images (e.g., still images, video sequences, etc.). In some implementations, the image processing system 400 may correct light source flickering caused by the presence of different types of lighting (e.g., from light-emitting diode (LED) elements) in a video sequence.

In some aspects, the image processing system 400 may represent a demosaicing architecture as described herein. In some aspects, the demosaicing architecture may include three (3) main modules. The first two modules may include the first demosaicing expert 410 and the second demosaicing expert 415. In some embodiments, the first demosaicing expert 410 may be focused on or configured to reconstruct general structures in an image (e.g., captured by the image sensor 405), and the second demosaicing expert 415 may be focused on or configured to reconstruct a residual of the first demosaicing expert 410 (e.g., situations where the first demosaicing expert 410 was insufficient, or otherwise failed). Additionally or alternatively, the second demosaicing expert 415 may be focused on or configured to reconstruct general structures in an image, and the first demosaicing expert 410 may be focused on or configured to reconstruct a residual of the second demosaicing expert 415. The third module of the demosaicing architecture may include the gating function (e.g., gating component 420), which is configured to decide how to combine the results of each expert.

In some aspects, the residual module (e.g., the expert that is configured to reconstruct the residual from the other expert that reconstructs general structures) may process areas in the captured image that include (e.g., suffer from) one or more artifacts (e.g., anomalies apparent during visual representation in digital graphics or other forms of imagery).

Accordingly, the residual domain module may be constructed using image signal processing concepts to remove or mitigate the artifacts.

In some aspects, the image processing system 400 may train each expert separately in a customized fashion based on the image signal processing task each respective expert is designed to solve. In some aspects, the image processing system 400 may utilize a modular structure to train each expert separately (e.g., rather than systems where all components of a network are trained together). For example, each expert may focus over different samples domains. While in some cases the different modules might suffer from the same artifacts, each module may utilize a different optimization scheme to generate an accurate reconstruction.

In some aspects, the image processing system 400 may use prior knowledge (e.g., based on image signal processing techniques) regarding common artifacts of each sub-module task in order to customize the optimization of each expert and module of the described architecture. Examples of such differences between the optimization process of each expert can be found in the Table 1 provided below:

tion tasks, color interpolation tasks, color correction tasks, color space conversion tasks, edge enhancement tasks, compression tasks, etc.

For example, in some aspects, the image refinement component 425 may utilize upsampling for refining the output image 435 to generate a refined image 440. Upsampling refers to the process of resampling in a multi-rate digital signal processing system. Upsampling can include expansion and filtering (i.e., interpolation). It may be performed on a sequence of samples of a signal (e.g., an image), and may produce an approximation of a sequence obtained by sampling the signal at a higher rate or resolution. The process of expansion refers to the process of inserting additional data points (e.g., zeros or copies of existing data points). Interpolation refers to the process of smoothing out the discontinuities (e.g., with a lowpass filter). In some cases, the filter is called an interpolation filter.

Additionally or alternatively, in some examples, the image refinement component 425 may utilize down-sampling for refining the output image 435 to generate the refined image 440. Down-sampling refers to the process of

TABLE 1

Examples of Customization of the Optimization Process for Each of the Experts

| | H Module | | L Module | |
|---|---|---|---|---|
| Artifact | Module Prior | Training Customization | Module Prior | Training Customization |
| Zipper Artifact | Noticeable around high frequency structures as a high frequency periodic pattern | Additional custom loss focuses over high frequency periodic artifacts | Noticeable around edges | Additional total variation loss term |
| Moiré Artifact | Noticeable around high frequency structures as a lower frequency periodic pattern | Additional custom loss for lower range frequency periodic artifacts | | |
| Over Smoothness | — | — | Noticeable around text patterns | Additional Sharpening task |

In certain aspects, in the example of Table 1, Module L may include or refer to the first expert (e.g., a first demosaicing expert) trained over the general dataset, and Module H may include or refer to a second expert (e.g., a second demosaicing expert) trained on the residual domain.

Based on the demosaicing architecture described herein and illustrated in FIG. 4, the demosaicing may out-perform other systems configured for image processing with respect to removing different artifacts (e.g., color Moiré, color desaturation, resolution, and text readability, among other examples). Additionally, based on the modular approach for training each expert separately in a customized fashion, the image processing system 400 may adapt its architecture and network based on customer feedback. For example, the image processing system 400 may train a chosen sub-module (e.g., specific expert), without training the entire model.

Image refinement component 425 may perform various image refinement tasks. For example, image refinement component 425 may process output image 435 to generate refine image 440 using tasks such as gamma correction tasks, automatic white balancing (AWB) tasks, super resolution tasks (e.g., upsampling, downsampling), pixel correcreducing samples (e.g., sample-rate reduction in a multi-rate digital signal processing system). Down-sampling can include compression and filtering (i.e., decimation). It may be performed on a sequence of samples of a signal (e.g., an image), and may produce an approximation of a sequence obtained by sampling the signal at a lower rate or resolution. Compression may refer to decimation by an integer factor. For instance, decimation by a factor of 10 results in using (e.g., keeping, encoding, sampling, etc.) every tenth sample. The process of compression thus refers to the process of removing data points. Additionally or alternatively, image refinement component 425 may utilize other types of techniques for refining the output image 435 to generate the refined image 440 not expressly listed or described herein.

Figure 5:
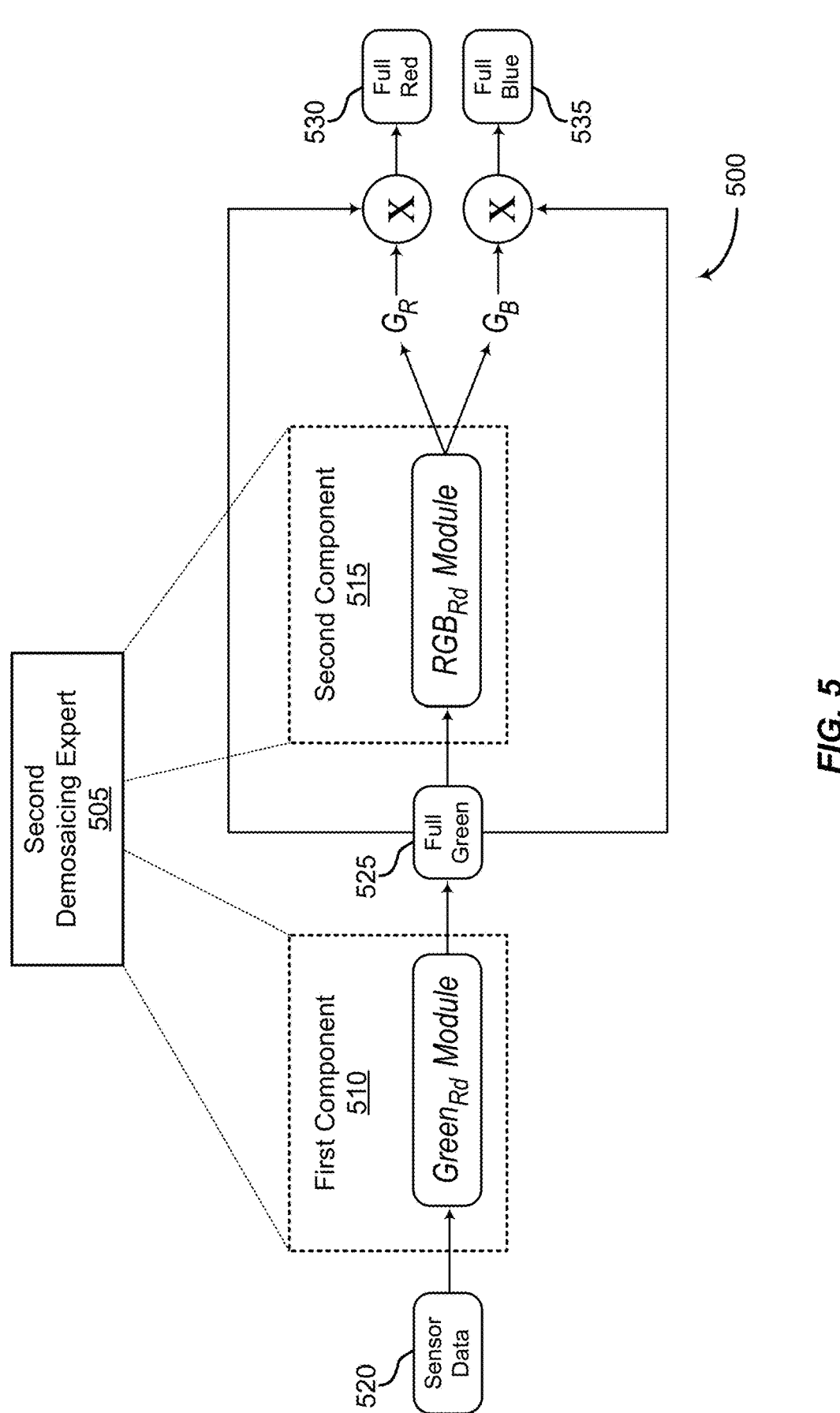

FIG. 5 shows an example of an image processing system 500 according to aspects of the present disclosure. Image processing system 500 is an example of, or includes aspects of, the corresponding element described with reference to FIGS. 1-4. In one aspect, image processing system 500 includes sensor data 520, second demosaicing expert 505, full green channel 525, full red channel 530, and full blue channel 535. Second demosaicing expert 505 is an example of, or includes aspects of, the corresponding element described with reference to FIGS. 2, 4, and 9. In one aspect, second demosaicing expert 505 includes first component 510 and second component 515. In some aspects, the second demosaicing expert 505 includes: a first component 510 configured to perform a first partial demosaicing operation on a green color of the sensor data 520 to obtain green image data; and a second component 515 configured to perform a second partial demosaicing operation based on the green image data to obtain red image data and blue image data. Sensor data 520 is an example of, or includes aspects of, the corresponding element described with reference to FIGS. 3 and 4. In some aspects, full green channel 525, full red channel 530, and full blue channel 535 may be examples of, or include aspects of, corrected image data described with reference to FIG. 3.

In some aspects, the image processing system 500 may correspond to an architecture for an expert that is focused on or configured to reconstruct a residual of an additional demosaicing expert as described with reference to FIG. 4. For example, as described with reference to FIG. 4, the second demosaicing expert 505 may be focused on or configured to reconstruct a residual of a first demosaicing expert (e.g., in situations where the first demosaicing expert failed or is less accurate than second demosaicing expert).

The image processing system 500 may utilize the concept that the green channel is sampled twice as many as the red and blue channels (e.g., based on the sensor data 520 being captured using a CFA such as a Bayer pattern of GRBG) to process the sensor data 520 and generate a full-resolution RGB color image from missing data captured using a CFA. For example, the second demosaicing component (e.g., second demosaicing expert 505) may use the first component 510 to first reconstruct a full green channel 525 (e.g., partial corrected image data). Subsequently, the second demosaicing component (e.g., second demosaicing expert 505) may use the second component 515 to reconstruct a full red channel 530 and a full blue channel 535 from the full green channel 525 (e.g., remaining corrected image data channel information). In some aspects, the second component 515 may operate based on the idea that for small patches (e.g., 8×8) in natural images, there is a high correlation between the different color channels. Accordingly, the second demosaicing expert 505 (e.g., based on the second component 515) may compute the correlation coefficients between the reconstructed full resolution green channel 525 and the red channel 530 and blue channel 535, rather than performing an interpolation process.

Image Restoration Processing

Figure 6:
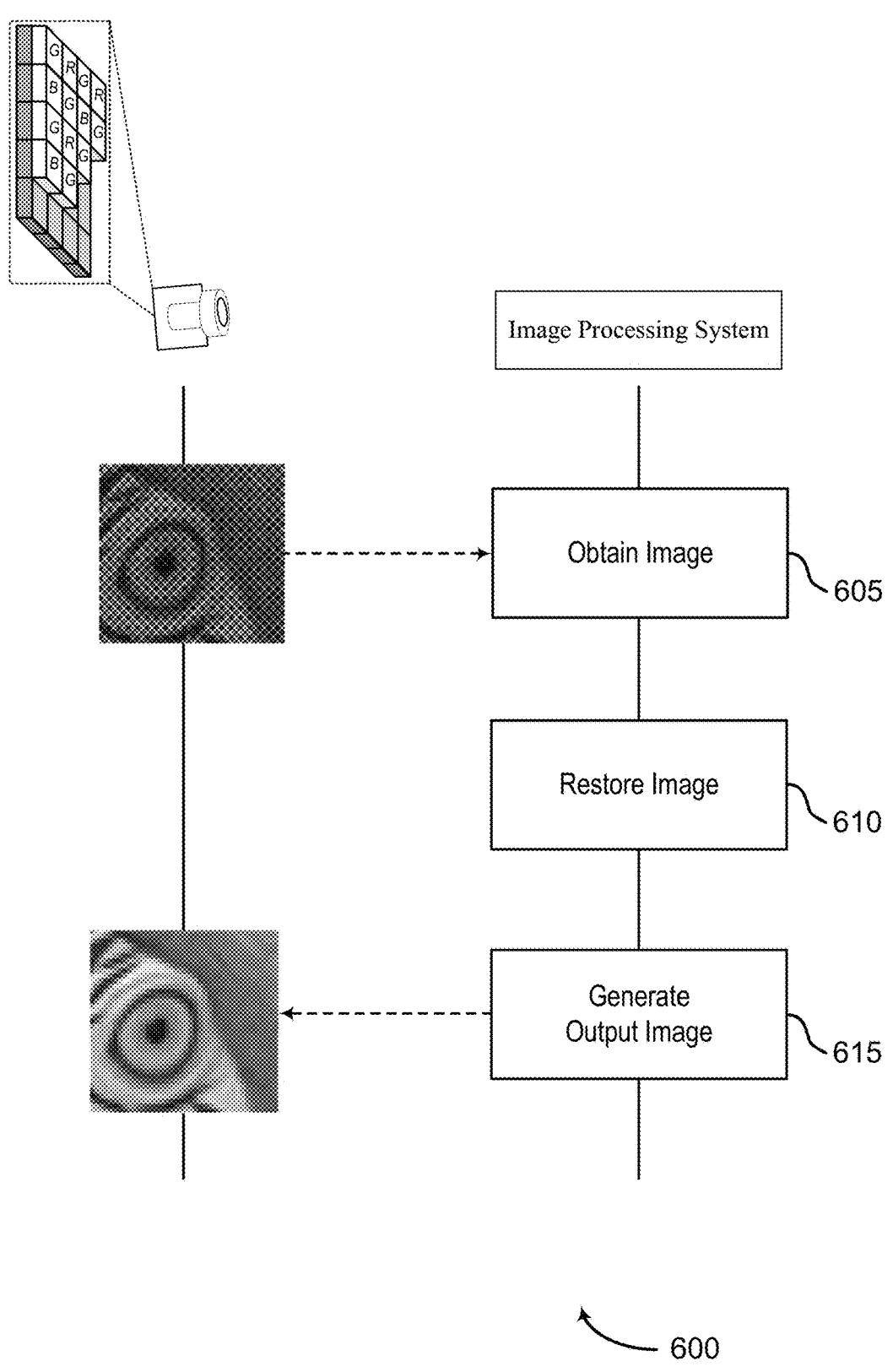
FIG. 6 shows an example image restoration flowchart, according to aspects of the present disclosure.

FIG. 6 shows an example of a method 600 an example image restoration flowchart according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 605, the system obtains an image (e.g., an input image, sensor data, etc.). For example, a user may capture an image (e.g., via an image sensor) and sensor data corresponding to the capture image may be sent to a server. In some cases, the operations of this step refer to, or may be performed by, a user device as described with reference to FIGS. 1 and 3. In some cases, the operations of this step refer to, or may be performed by, an image sensor as described with reference to FIGS. 2-4. In some cases, the operations of this step refer to, or may be performed by, an image processing system as described with reference to FIGS. 1-5.

At operation 610, the system performs image restoration (e.g., the system performs one or more demosaicing operations) on the sensor data. In some cases, the operations of this step refer to, or may be performed by, a user device as described with reference to FIGS. 1 and 3. In some cases, the operations of this step refer to, or may be performed by, a server as described with reference to FIG. 1. In some cases, the operations of this step refer to, or may be performed by, an image processing system as described with reference to FIGS. 1-5.

At operation 615, the system generates an output image (e.g., based on the obtained input image, the image restoration operations, etc.). In some cases, the operations of this step refer to, or may be performed by, a server as described with reference to FIG. 1. In some cases, the operations of this step refer to, or may be performed by, an image processing system as described with reference to FIGS. 1-5.

Figure 7:
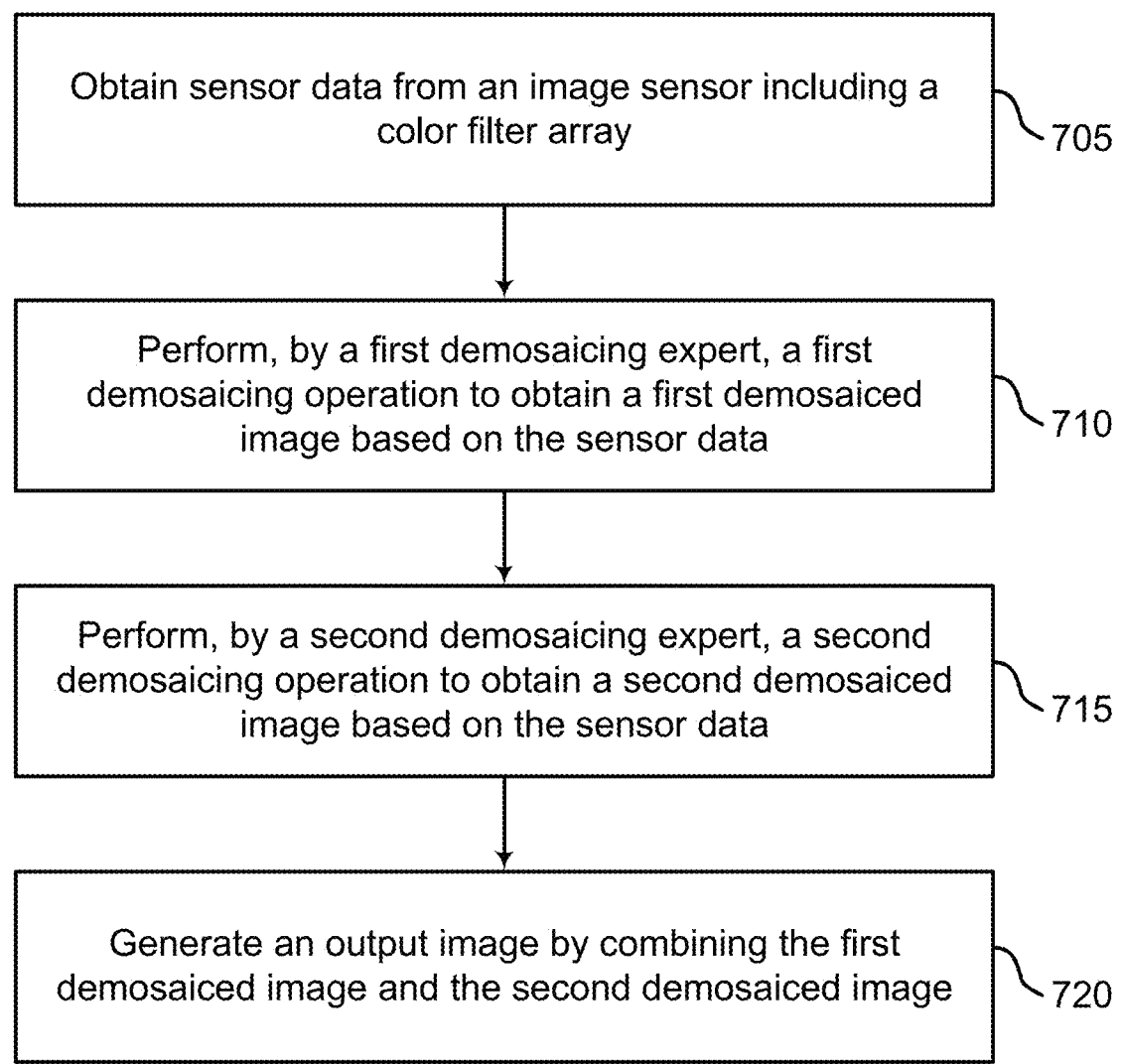
FIG. 7 shows an example of a method for image processing, according to aspects of the present disclosure.

FIG. 7 shows an example of a method 700 a method for image processing according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 705, the system obtains sensor data from an image sensor including a color filter array. In some cases, the operations of this step refer to, or may be performed by, an image sensor as described with reference to FIGS. 2-4.

At operation 710, the system performs a first demosaicing operation to obtain a first demosaiced image based on the sensor data. In some cases, the operations of this step refer to, or may be performed by, a first demosaicing expert as described with reference to FIGS. 2, 4, and 9.

At operation 715, the system performs a second demosaicing operation to obtain a second demosaiced image based on the sensor data. In some cases, the operations of this step refer to, or may be performed by, a second demosaicing expert as described with reference to FIGS. 2, 4, 5, and 9. In some aspects, operations 710 and 715 may be performed in parallel (e.g., based on a same starting time, where at least a portion of time dedicated to each operation overlaps, etc.).

At operation 720, the system generates an output image by combining the first demosaiced image and the second demosaiced image. In some cases, the operations of this step refer to, or may be performed by, a gating component as described with reference to FIGS. 2 and 4.

In some aspects, the color filter array comprises a Bayer color filter array.

In some aspects, the first demosaicing operation comprises a general demosaicing operation, and the second demosaicing operation comprises a residual demosaicing operation that corrects one or more image artifacts.

In some aspects, the second demosaicing operation further comprises: performing a first partial demosaicing operation on a green color of the sensor data to obtain green image data; and performing a second partial demosaicing operation based on the green image data to obtain red image data and blue image data.

Some examples of the method, apparatus, non-transitory computer readable medium, and system further include computing one or more color correlation coefficients, wherein the second partial demosaicing operation is based on the one or more color correlation coefficients.

Some examples of the method 700 further include performing an image refinement on the output image to obtain a refined image.

Some examples of the method 700 further include performing, by a third demosaicing expert, a third demosaicing operation to obtain a third demosaiced image based on the sensor data, wherein the output image is generated based on third demosaiced image.

Some examples of the method 700 further include computing a weighting map, comprising weighting parameters for each pixel of the first demosaiced image and the second demosaiced image, wherein the output image is generated based on the weighting map. Some examples of the method 700 further include activating specific experts (e.g., first or second demosaicing experts) during image processing tasks to provide the correct image reconstruction, while other experts not selected may remain inactive.

Training

Figure 8:
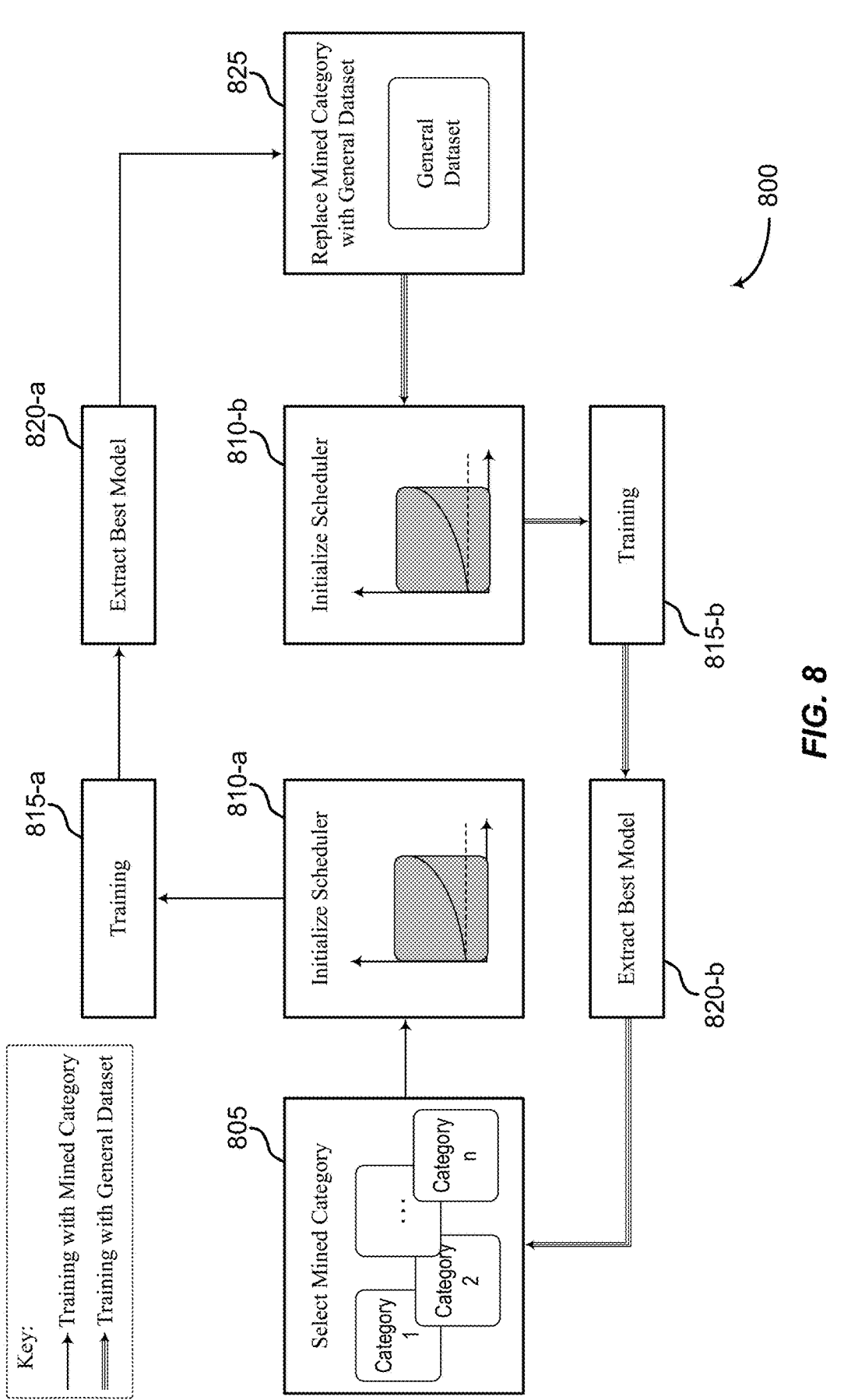
FIG. 8 shows an example flowchart for cyclic training to perform the optimization of experts, according to aspects of the present disclosure.

FIG. 8 shows an example of a method 800 an example flowchart for cyclic training to perform the optimization of experts according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

According to some embodiments, a training procedure may include the steps of constructing multiple datasets representing categories of images and utilizing a non-trivial optimization scheme to perform the optimization of the experts. The optimization scheme may include the cyclic training method illustrated by method 800.

At operation 805, the system selects mined category (e.g., select training data from category 1 through category n). In some aspects, the system may find different patches that are prone to some kind of artifact (e.g., category). In some aspects, operation 805 may be a first step of a cyclic training (e.g., or a prerequisite for performing the cyclic training). In some cases, the operations of this step refer to, or may be performed by, a training component as described with reference to FIG. 2. In some cases, the operations of this step refer to, or may be performed by, an image processing system as described with reference to FIGS. 1-5.

At operation 810, the system initializes scheduler. In some cases, the operations of this step refer to, or may be performed by, a training component as described with reference to FIG. 2. In some cases, the operations of this step refer to, or may be performed by, an image processing system as described with reference to FIGS. 1-5.

At operation 815, the system trains a neural network (e.g., CNN) to perform optimization of experts (e.g., demosaicing experts as described with reference to FIGS. 1-7). In some cases, the operations of this step refer to, or may be performed by, a training component as described with reference to FIG. 2. In some cases, the operations of this step refer to, or may be performed by, an image processing system as described with reference to FIGS. 1-5.

At operation 820, the system extracts a model (e.g., the system extracts, from the training session operation 815, the model with the highest performance). In some cases, the operations of this step refer to, or may be performed by, a training component as described with reference to FIG. 2. In some cases, the operations of this step refer to, or may be performed by, an image processing system as described with reference to FIGS. 1-5.

At operation 825, the system replaces mined category with general dataset. In some cases, the operations of this step refer to, or may be performed by, a training component as described with reference to FIG. 2. In some cases, the operations of this step refer to, or may be performed by, an image processing system as described with reference to FIGS. 1-5.

In some aspects, the method 800 may illustrate a cyclic training procedure as described previously to perform the optimization of experts. Additionally, the method 800 may improve reconstruction results for the experts based on a two-step training. For example, the two-step training may include (1) constructing datasets of sub-categories and (2) utilizing a non-trivial optimization scheme. Where (2) represents a cyclic training procedure which includes two phases. The first phase of the cyclic training may include training over a specific sub-category for several epochs, while the second phase includes training over the entire dataset. Each phase may be initialized by a model's weights that achieved a lowest validation loss across all sub-categories in the previous phase. Every cycle, a different sub-category may be selected. The number of cycles may depend on the number of categories and architecture.

In the first phase, the system may search for challenging sub-categories from an overall dataset. For example, the challenging sub-categories may represent patches (e.g., sections of an image) that are poorly reconstructed by a model (e.g., neural network model) that was trained over an entire dataset. As shown in the example of FIG. 8, the first step may include the operation 805 of selecting mined categories. The system may then perform an elimination process (e.g., a first scheduler initialization operation 810-*a*, a first training operation 815-*a*, and a first model extracting operation 820-*a*) to keep sub-categories that will have a positive impact on network results after the optimization scheme used in the second step. As an example, for demosaicing, the sub-categories that are kept may include areas of images that suffer from artifacts, such as moiré, zipper, etc.

In the second phase, the system uses an optimization scheme that alternates between the selected sub-categories to improve generalization and achieve better results. In some aspects, the second step may include training over an entire dataset (e.g., after the operation 825, where the system replaces a mined category with the general dataset). For example, the general dataset may be used for a second scheduler initialization operation 810-*b*, a second training operation 815-*b*, and a second model extracting operation 820-*b* to train or refine the datasets of the sub-categories. In some aspects, the scheduler may modify the learning rate during training. In some aspects, operation 820 may include extracting information (e.g., a model with the highest performance) from the training session operation 815 the model with the highest performance (e.g., and the data may be unchanged). By alternating between a mined sub-category dataset (e.g., the first phase) and the original dataset (e.g., the second phase) during training, the model may have a better chance to converge at the same rate over both datasets, resulting in a solution with reduced inductive bias.

Figure 9:
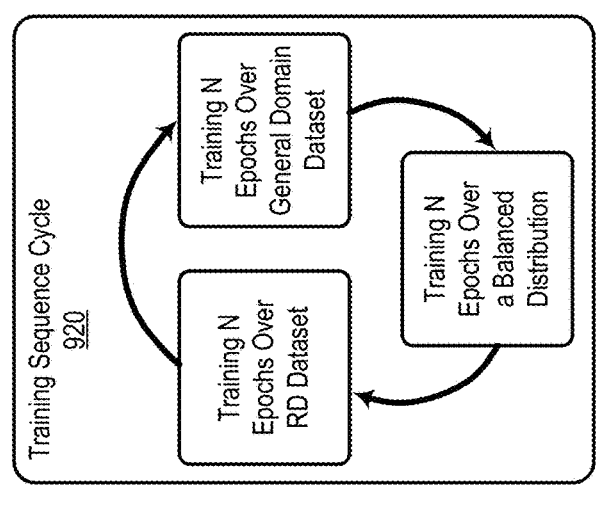
FIG. 9 shows an example diagram illustrating aspects for the training of the gating function, according to aspects of the present disclosure.

FIG. 9 shows an example of example training diagram 900 illustrating aspects for the training of the gating function 905 according to aspects of the present disclosure. In one aspect, the training diagram 900 includes gating function 905, first demosaicing expert 910, second demosaicing expert 915, and training sequence cycle 920. Gating function 905 is an example of, or includes aspects of, the corresponding element described with reference to FIGS. 2 and 4. First demosaicing expert 910 is an example of, or includes aspects of, the corresponding element described with reference to FIGS. 2 and 4. Second demosaicing expert 915 is an example of, or includes aspects of, the corresponding element described with reference to FIGS. 2, 4, and 5.

In some aspects, the training diagram 900 may be utilized to balance an attention mechanism (e.g., attention maps) using a circular optimization technique (e.g., the training sequence cycle 920). In the machine learning field, an attention mechanism is a method of placing differing levels of importance on different elements of an input. Calculating attention may involve three basic steps. First, a similarity between query and key vectors obtained from the input is computed to generate attention weights. Similarity functions used for this process may include dot product, splice, detector, and the like. Next, a second function may be used to normalize the attention weights. Finally, the attention weights may be weighed together with their corresponding values. In the context of an attention network, the key and value are typically vectors or matrices that are used to represent the input data. The key is used to determine which parts of the input the attention mechanism should focus on, while the value is used to represent the actual data being processed.

Using a standard training method for the gating function 905 (e.g., gating module) may result in a solution, meaning the method either chooses only one of the experts or gives both of the experts the same weight. This solution can partly be traced to the fact that the distribution of the samples from the dataset may not be uniform.

Accordingly, the training sequence cycle 920 may following a training regime for the gating function 905 that includes: (1) training using patches from the residual domain for N epochs, (2) training using patches from the general domain for N epochs, and (3) training using a collection of patches balanced between the residual and general domains for N epochs. In some cases, aspects of sequence cycle 920 are further described herein, for example, with reference to FIG. 8. The training process regime may be repeated until a convergence is observed for the gating function 905. During the training process, weights of the general and residual modules may be kept frozen (e.g., the weights are not updated between each training).

FIG. 10 shows an example of a method 1000 a method for training an image processing system according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1005, the system obtains training data including sensor data from a color filter array and a ground truth demosaiced image. In some cases, the operations of this step refer to, or may be performed by, a training component as described with reference to FIG. 2.

At operation 1010, the system divides the training data into a first category and a second category based on the presence of an image artifact. In some cases, the operations of this step refer to, or may be performed by, a training component as described with reference to FIG. 2.

At operation 1015, the system trains the neural network to perform demosaicing in a first phase based on the first category of the training data. In some cases, the operations of this step refer to, or may be performed by, a training component as described with reference to FIG. 2.

At operation 1020, the system trains the neural network to perform demosaicing in a second phase based on the second category of the training data. In some cases, the operations of this step refer to, or may be performed by, a training component as described with reference to FIG. 2.

Accordingly, a method, apparatus, non-transitory computer readable medium, and system for training a modular image processing system are described. One or more aspects of the method, apparatus, non-transitory computer readable medium, and system include: obtaining training data including sensor data from a color filter array and a ground truth demosaiced image; dividing the training data into a first category and a second category based at least in part on the presence of an image artifact; training the neural network to perform demosaicing in a first phase based on the first category of the training data; and training the neural network to perform demosaicing in a second phase based on the second category of the training data.

In some aspects, the first training phase is based on a specific dataset excluding the first category of the training data, and wherein the second training phase is based on a general dataset that includes the first category of the training data and the second category of the training data.

Some examples of the method, apparatus, non-transitory computer readable medium, and system further include training the neural network to perform demosaicing in a third phase based on the first category of the training data.

Some examples of the method, apparatus, non-transitory computer readable medium, and system further include training a first demosaicing expert of the neural network to perform a first demosaicing operation to obtain a first demosaiced image based on the sensor data from the image sensor. Some examples further include training a second demosaicing expert of the neural network to perform a second demosaicing operation to obtain a second demosaiced image based on the sensor data.

In some aspects, a gating component of the neural network is trained in the first phase and the second phase after training the first demosaicing expert and the second demosaicing expert.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

The described systems and methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method comprising:
obtaining sensor data from an image sensor comprising a color filter array;
performing, by a first neural-network-based demosaicing expert independently trained to perform a general demosaicing operation, a first demosaicing operation to obtain a first demosaiced image based on the sensor data;
performing, by a second neural-network-based demosaicing expert independently trained to perform a residual demosaicing operation that corrects one or more image artifacts, a second demosaicing operation to obtain a second demosaiced image based on the sensor data; and generating, by a gating component configured to compute a per-pixel weighting map, an output image by combining the first demosaiced image and the second demosaiced image based on the weighting map.

2. The method of claim 1, wherein:
the color filter array comprises a Bayer color filter array.

3. The method of claim 1, wherein:
the second demosaicing operation further comprises: performing a first partial demosaicing operation on a green color of the sensor data to obtain green image data; and
performing a second partial demosaicing operation based on the green image data to obtain red image data and blue image data.

4. The method of claim 3, further comprising:
computing one or more color correlation coefficients, wherein the second partial demosaicing operation is based on the one or more color correlation coefficients.

5. The method of claim 1, further comprising:
performing an image refinement on the output image to obtain a refined image.

6. The method of claim 1, further comprising:
performing, by a third demosaicing expert, a third demosaicing operation to obtain a third demosaiced image based on the sensor data, wherein the output image is generated based on third demosaiced image.

7. Apparatus for image processing, comprising:
at least one processor;
at least one memory storing instructions and in electronic communication with the at least one processor;
the apparatus further comprising an image sensor comprising a color filter array;
a first neural-network-based demosaicing expert independently trained to perform a general demosaicing operation and comprising parameters stored in the at least one memory and configured to perform a first demosaicing operation to obtain a first demosaiced image based on sensor data from the image sensor;
a second neural-network-based demosaicing expert independently trained to perform a residual demosaicing operation that corrects one or more image artifacts and comprising parameters stored in the at least one memory and configured to perform a second demosaicing operation to obtain a second demosaiced image based on the sensor data; and
a gating component configured to compute a per-pixel weighting map and to combine the first demosaiced image and the second demosaiced image based on the weighting map to obtain an output image.

8. The apparatus of claim 7, wherein:
the color filter array comprises a Bayer color filter array.

9. The apparatus of claim 7, wherein:
the second demosaicing expert comprises: a first component configured to perform a first partial demosaicing operation on a green color of the sensor data to obtain green image data; and a second component configured to perform a second partial demosaicing operation based on the green image data to obtain red image data and blue image data.

10. The apparatus of claim 7, further comprising:
an image refinement component configured to refine the output image to obtain a refined image.

11. The apparatus of claim 7, further comprising:
a third demosaicing expert comprising parameters stored in the at least one memory and configured to perform a third demosaicing operation to obtain a third demosaiced image based on the sensor data, wherein the output image is obtained based on third demosaiced image.

12. A method comprising:

obtaining training data including sensor data from a color filter array and a ground truth demosaiced image;

dividing the training data into a first category and a second category based at least in part on a presence of an image artifact;

training a first neural network based demosaicing expert independently to perform demosaicing in a first phase based on the first category of the training data; and training a second neural network based demosaicing expert independently to perform demosaicing in a second phase based on the second category of the training data.

13. The method of claim 12, wherein:

the first training phase is based on a specific dataset excluding the first category of the training data, and wherein the second training phase is based on a general dataset that includes the first category of the training data and the second category of the training data.

14. The method of claim 12, further comprising:

training the neural network to perform demosaicing in a third phase based on the first category of the training data.

15. The method of claim 12, further comprising:

training a first demosaicing expert of the neural network to perform a first demosaicing operation to obtain a first demosaiced image based on the sensor data; and training a second demosaicing expert of the neural network to perform a second demosaicing operation to obtain a second demosaiced image based on the sensor data.

16. The method of claim 15, wherein:

a gating component of the neural network is trained in the first phase and the second phase after training the first demosaicing expert and the second demosaicing expert.

* * * * *